United States Patent
Yonezawa et al.

(10) Patent No.: US 9,472,333 B2
(45) Date of Patent: Oct. 18, 2016

(54) PLANAR TYPE TRANSFORMER AND SWITCHING POWER SUPPLY CIRCUIT

(71) Applicant: FUJITSU LIMITED, Kawasaki, Kanagawa (JP)

(72) Inventors: Yu Yonezawa, Sagamihara (JP); Hiroshi Nakao, Yamato (JP); Yoshiyasu Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 35 days.

(21) Appl. No.: 14/661,717

(22) Filed: Mar. 18, 2015

(65) Prior Publication Data

US 2015/0302972 A1 Oct. 22, 2015

(30) Foreign Application Priority Data

Apr. 22, 2014 (JP) .................................. 2014-088127

(51) Int. Cl.
*H01F 5/00* (2006.01)
*H01F 27/28* (2006.01)
*H02M 3/28* (2006.01)

(52) U.S. Cl.
CPC ... *H01F 27/2804* (2013.01); *H01F 2027/2809* (2013.01); *H01F 2027/2819* (2013.01); *H02M 3/28* (2013.01)

(58) Field of Classification Search
CPC .................. G05F 1/575; H02M 3/28; H02M 2001/0009; H01F 2017/0066
USPC ................ 323/222, 224, 228, 232, 282–288; 336/83, 178, 200, 212, 232, 233
See application file for complete search history.

(56) References Cited

U.S. PATENT DOCUMENTS

| 5,694,030 | A | * | 12/1997 | Sato | ........................ | G05F 1/575 |
| | | | | | | 323/282 |
| 6,154,376 | A | * | 11/2000 | Dan-Harry | .............. | H02M 3/28 |
| | | | | | | 363/131 |
| 8,638,578 | B2 | * | 1/2014 | Zhang | ................. | H02M 1/4225 |
| | | | | | | 323/228 |
| 8,773,232 | B2 | * | 7/2014 | Kato | ................... | H01F 27/2804 |
| | | | | | | 336/200 |
| 2003/0132825 | A1 | | 7/2003 | Gamou | | |

FOREIGN PATENT DOCUMENTS

JP   2002-270437 A   9/2002
JP   2010-93174 A   4/2010

* cited by examiner

*Primary Examiner* — Rajnikant Patel
(74) *Attorney, Agent, or Firm* — Arent Fox LLP

(57) ABSTRACT

A planar type transformer includes: a multilayer substrate including a primary main winding pattern and a secondary main winding pattern that perform first power transmission, the primary main winding pattern and the secondary main winding pattern being stacked with an insulating layer interposed between the primary main winding pattern and the secondary main winding pattern; and an auxiliary winding that is disposed outside the multilayer substrate and performs second power transmission between the auxiliary winding and the primary main winding pattern or the secondary main winding pattern.

5 Claims, 11 Drawing Sheets

PLANAR TYPE TRANSFORMER AND SWITCHING POWER SUPPLY CIRCUIT

CROSS-REFERENCE TO RELATED APPLICATION

This application is based upon and claims the benefit of priority of the prior Japanese Patent Application No. 2014-088127, filed on Apr. 22, 2014, the entire contents of which are incorporated herein by reference.

FIELD

The embodiments discussed herein are related to a planar type transformer and a switching power supply circuit.

BACKGROUND

A planar type transformer (hereinafter referred to as a planar transformer) may be reduced in size compared with the winding transformers in related art, and so in recent years, the planar transformer has found increasing use in switching power supply circuits of various information apparatuses.

The planar transformer has a structure in which primary and secondary winding patterns (hereinafter referred to as a primary main winding pattern and a secondary main winding pattern) are stacked with an insulating layer interposed between the primary and secondary main winding patterns that serve as the main windings for performing power transmission. A planar transformer provided with an auxiliary winding pattern has been presented, the auxiliary winding pattern being used for power transmission between the auxiliary winding pattern and the primary or secondary main winding pattern. The auxiliary winding pattern is used, for example, for power supply to a control circuit that controls a switching element that switches to determine whether or not a switching current is supplied to the primary main winding pattern.

In order to reduce the resistance loss of a planar transformer, it is desirable that the line width (pattern width) of each main winding pattern be increased as much as possible and the main winding pattern is disposed in multiple layers, and consequently the number of layers tends to increase. Further addition of an auxiliary winding pattern is accompanied by additional formation of an insulating layer or the like (when an odd number of winding pattern layers is provided, a dummy layer (described later) for avoiding curling of a multilayer substrate is also added), thereby increasing the height of the multilayer substrate, and thus the planar transformer is increased in size.

The following are reference documents.
[Document 1] Japanese Laid-open Patent Publication No. 2002-270437 and
[Document 2] Japanese Laid-open Patent Publication No. 2010-93174.

SUMMARY

According to an aspect of the invention, a planar type transformer includes: a multilayer substrate including a primary main winding pattern and a secondary main winding pattern that perform first power transmission, the primary main winding pattern and the secondary main winding pattern being stacked with an insulating layer interposed between the primary main winding pattern and the secondary main winding pattern; and an auxiliary winding that is disposed outside the multilayer substrate and performs second power transmission between the auxiliary winding and the primary main winding pattern or the secondary main winding pattern.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Hereinafter, an embodiment for implementing the disclosure will be described with reference to the accompanying drawings.

First Embodiment

Figure 1:
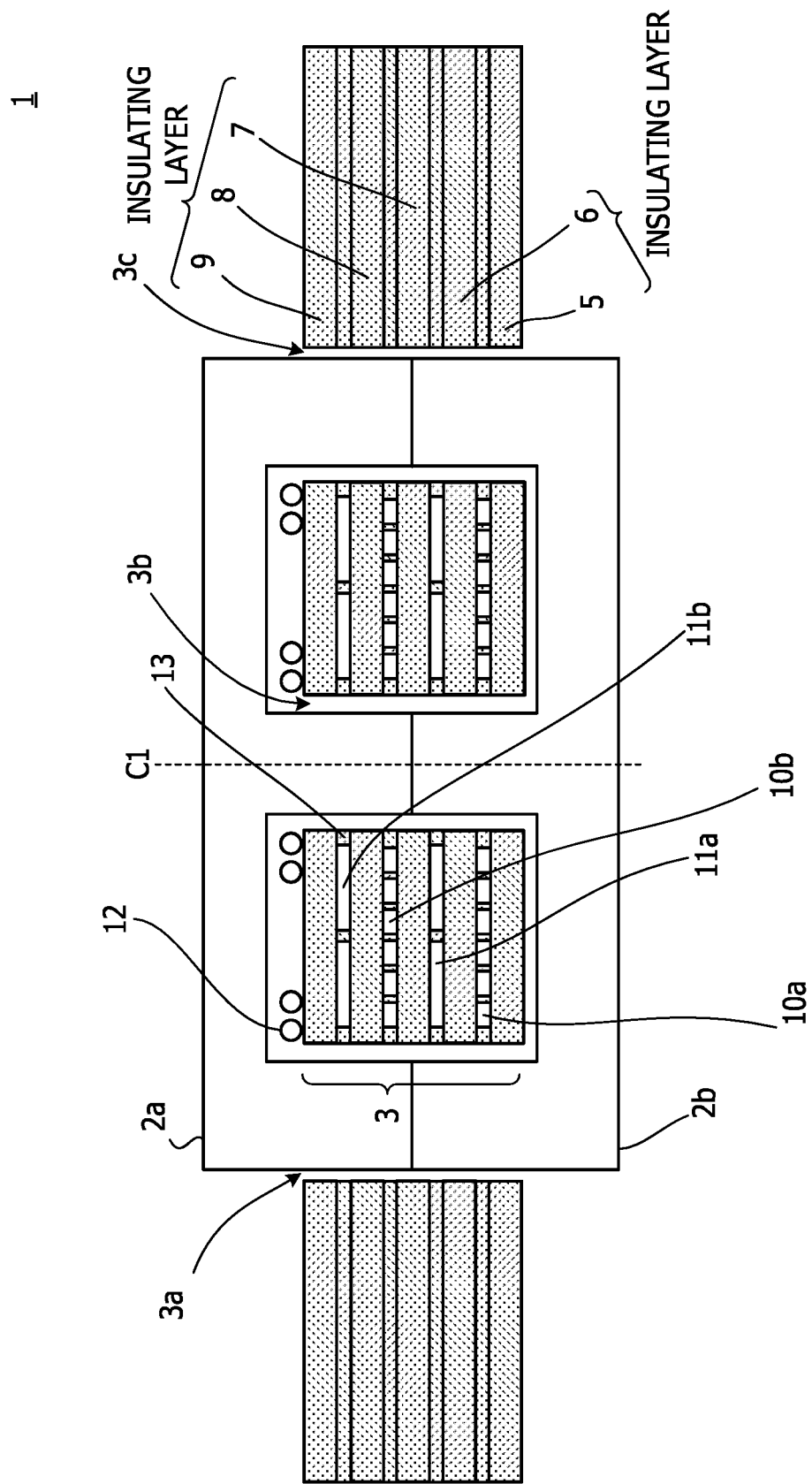
FIG. 1 is a cross-sectional view illustrating an example planar transformer according to a first embodiment.
Figure 2:
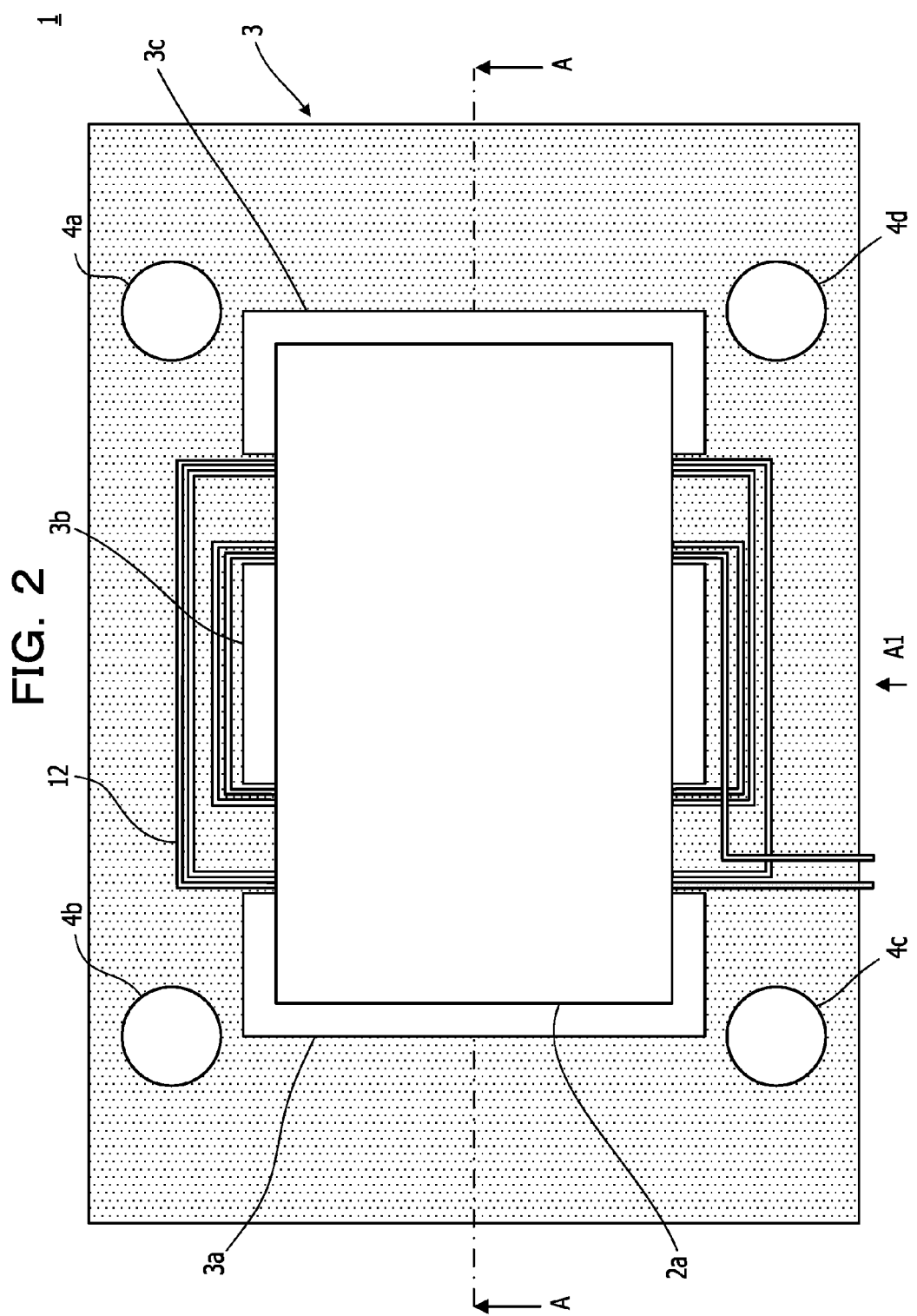
FIG. 2 is a plan view illustrating the example planar transformer according to the first embodiment.
Figure 3:
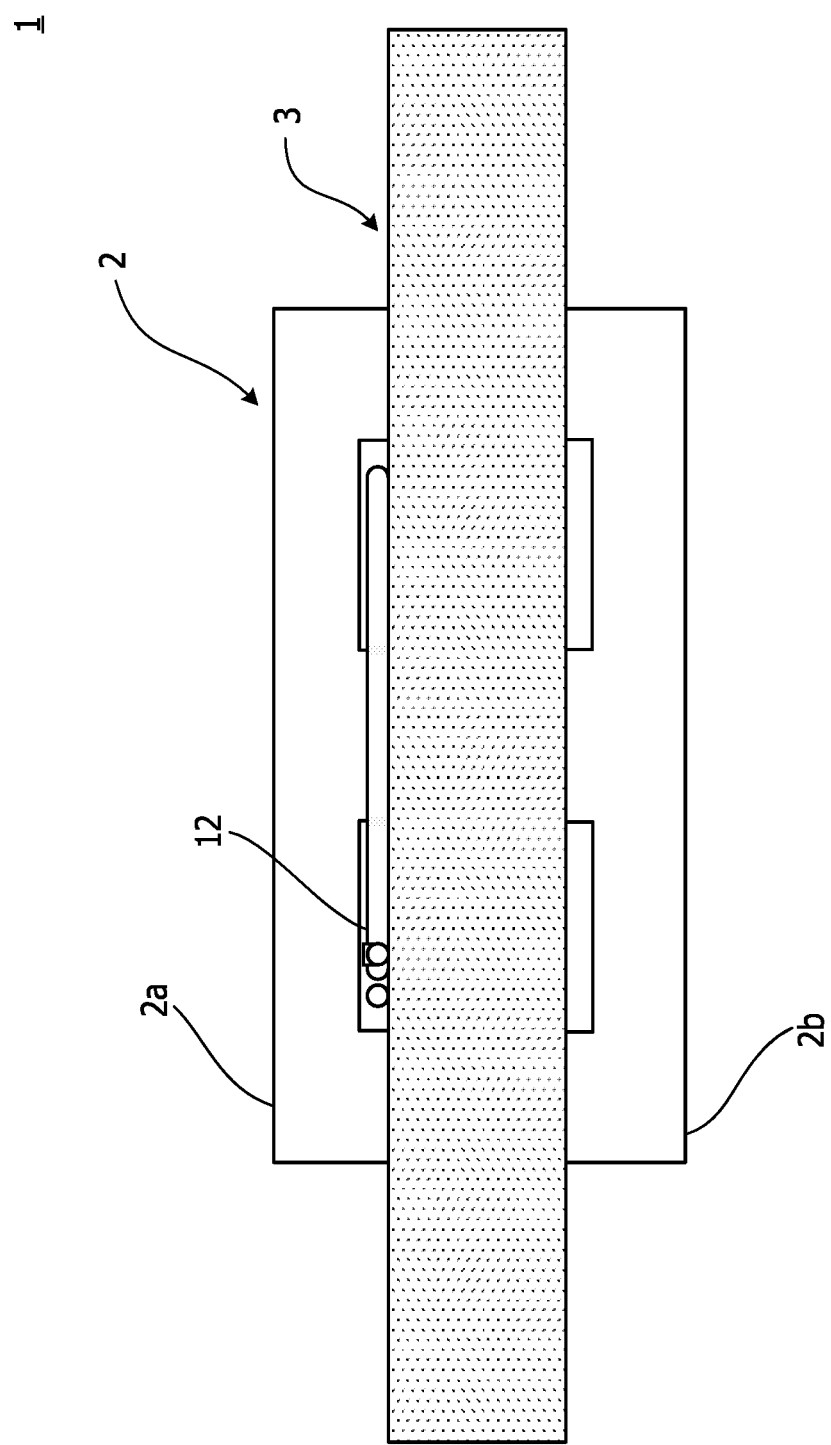
FIG. 3 is a side view illustrating the example planar transformer according to the first embodiment.

FIG. 1 is a cross-sectional view illustrating an example planar transformer according to a first embodiment, FIG. 2 is a plan view illustrating the example planar transformer according to the first embodiment, and FIG. 3 is a side view illustrating the example planar transformer according to the first embodiment. FIG. 1 is a cross-sectional view taken along line I-I of a planar transformer 1 illustrated in FIG. 2. FIG. 3 is a side view of the planar transformer 1 as seen from the direction of arrow A1 of FIG. 2.

The planar transformer 1 includes cores 2a, 2b, a multilayer substrate 3, and an auxiliary winding 12.

As illustrated in FIG. 1, the cores 2a, 2b are each an E-shaped cross-sectional member made of ferrite (magnetic material), for example. The cores 2a, 2b are combined so that their inner leg and outer legs are inserted into through holes 3a, 3b, 3c which are formed in the multilayer substrate 3, and the cores 2a, 2b cover part of the multilayer substrate 3.

As illustrated in FIG. 1, the multilayer substrate 3 has insulating layers 5, 6, 7, 8, 9, primary main winding patterns 10a, 10b, and secondary main winding patterns 11a, 11b, and has a stacked layer structure in which the main winding patterns are stacked with an insulating layer interposed between any adjacent main winding patterns, the main winding patterns being each a conductive pattern. The primary main winding patterns 10a, 10b and the secondary main winding patterns 11a, 11b are wound around a central axis C1.

A prepreg 13 is interposed between the primary main winding patterns 10a, 10b, the secondary main winding patterns 11a, 11b, and the insulating layers 5 to 9. Some of the insulating layers 5 to 9 each may be a prepreg. It is possible to implement such a stacked layer structure, for example, by bonding insulating layers (core base materials) 6, 8 together via a prepreg, and heating and pressurizing the bonded insulating layers, the insulating layers (core base materials) 6, 8 having both sides on which the primary main winding patterns 10a, 10b and the secondary main winding patterns 11a, 11b are formed, respectively. In this case, the insulating layer 7 is a prepreg. The insulating layers 5, 9 may also be a prepreg.

The primary main winding patterns 10a, 10b are electrically connected to each other via a through hole or a via (not illustrated). The secondary main winding patterns 11a, 11b are also electrically connected to each other via a through hole or a via (not illustrated).

As illustrated in FIGS. 1 and 2, the multilayer substrate 3 has through holes 3a, 3b, and 3c. The through holes 3a, 3c are formed so as to enclose the area in which the primary main winding patterns 10a, 10b and the secondary main winding patterns 11a, 11b are formed. On the other hand, the through hole 3b is formed so as to extend along the central axis C1 of the primary main winding patterns 10a, 10b and the secondary main winding patterns 11a, 11b.

As illustrated in FIG. 2, input/output terminals 4a, 4b, 4c, 4d are provided on the surface of the multilayer substrate 3, the input/output terminals 4a, 4b, 4c, 4d being connected to both ends of the primary main winding patterns 10a, 10b and the secondary main winding patterns 11a, 11b, respectively via through holes or vias (not illustrated). The input/output terminals 4a, 4b, 4c, 4d are used when the primary main winding patterns 10a, 10b and the secondary main winding patterns 11a, 11b are electrically connected to an external circuit of the planar transformer 1.

In the multilayer substrate 3 like this, power transmission is performed between the primary main winding patterns 10a, 10b and the secondary main winding patterns 11a, 11b.

The auxiliary winding 12 is disposed outside the above-described multilayer substrate 3 and performs power transmission between the auxiliary winding 12 and the primary main winding patterns 10a, 10b or the secondary main winding patterns 11a, 11b inside the multilayer substrate 3. The auxiliary winding 12 is conductor wiring, and may have, for example, an insulating coating that covers the conductor wiring.

In the example planar transformer 1 according to the first embodiment illustrated in FIGS. 1 to 3, the auxiliary winding 12 is disposed on the insulating layer 9 of the multilayer substrate 3, and is wound around the central axis C1. Part of the auxiliary winding 12 is disposed in the gap between the core 2a and the multilayer substrate 3. The auxiliary winding 12 is fixed on the insulating layer 9 with an adhesive tape or varnish, for example.

In this manner, disposition of the auxiliary winding 12 outside the multilayer substrate 3 may omit the formation of an insulating layer for the auxiliary winding 12 if provided inside the multilayer substrate 3, and thus the height of the multilayer substrate 3 may be reduced. Consequently, the planar transformer 1 may be reduced in size.

Hereinafter, in order to explain this effect, a planar transformer will be described as a comparative example, the planar transformer having the auxiliary winding provided in the multilayer substrate.

Comparative Example

Figure 4:
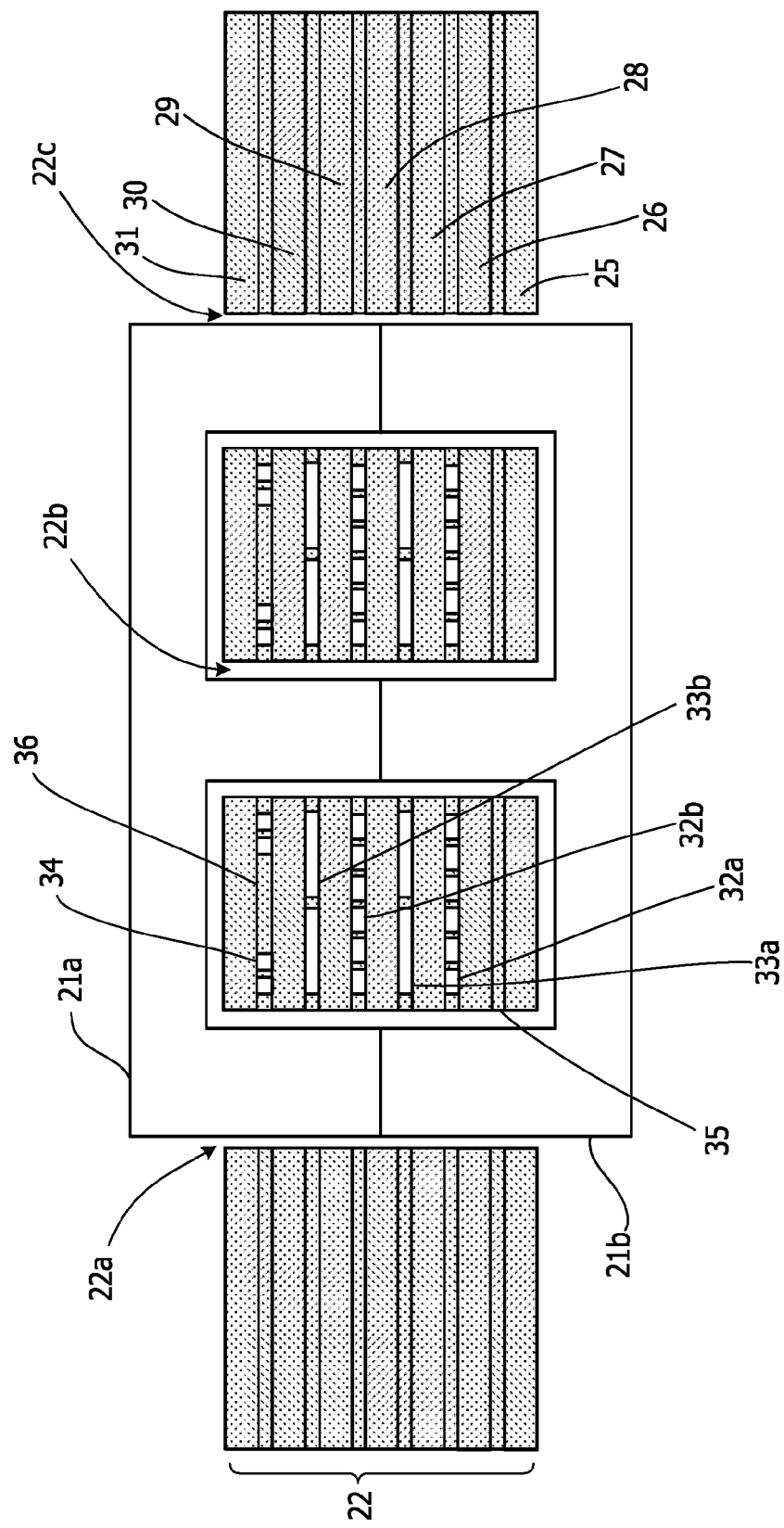
FIG. 4 is a cross-sectional view illustrating a comparative example of planar transformer.
Figure 5:
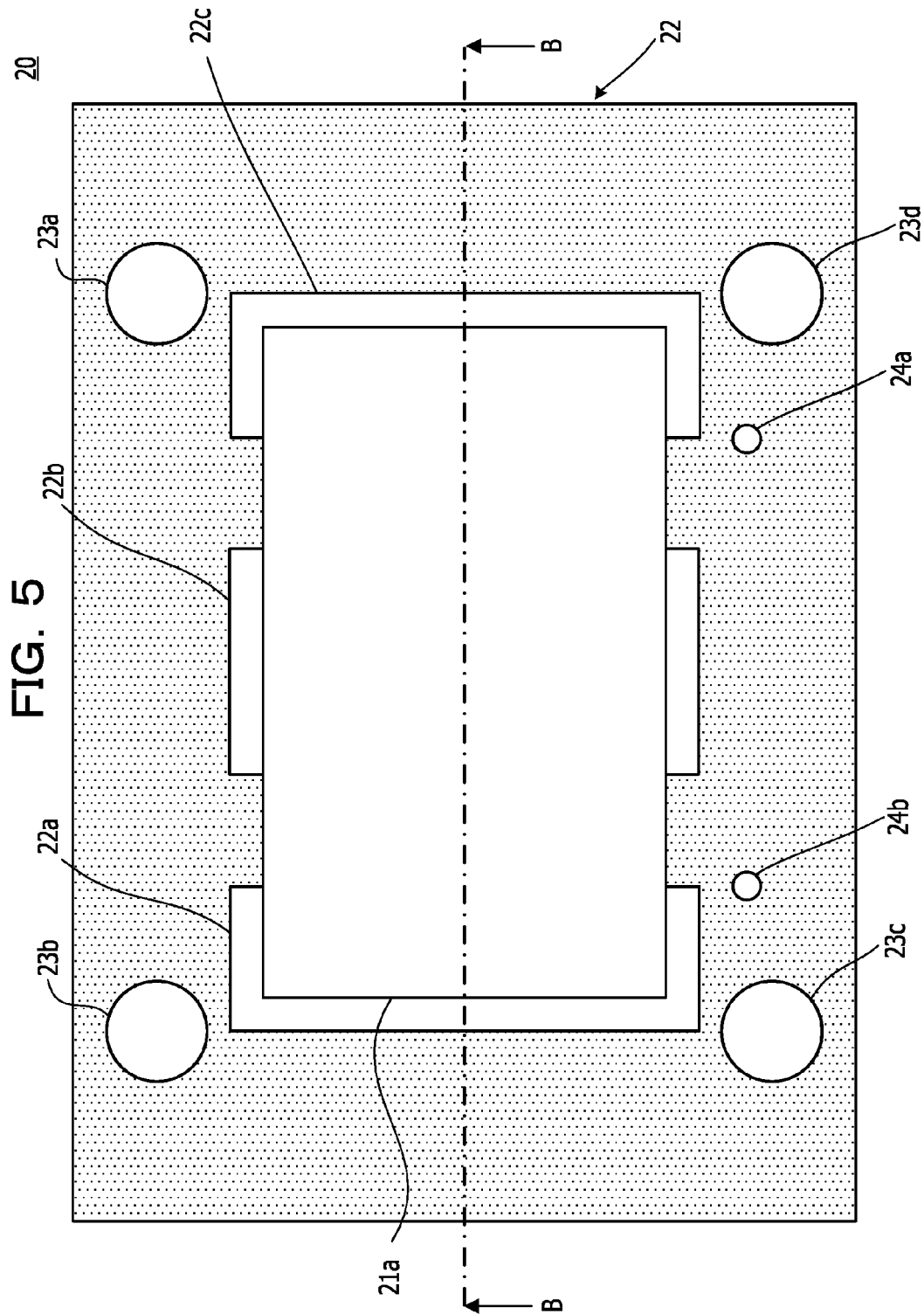
FIG. 5 is a plan view illustrating the comparative example of planar transformer.

FIG. 4 is a cross-sectional view illustrating a comparative example of planar transformer, and FIG. 5 is a plan view illustrating the comparative example of planar transformer. It is to be noted that FIG. 4 is a cross-sectional view taken along line IV-IV of the planar transformer illustrated in FIG. 5.

Similarly to the planar transformer 1 according to the first embodiment, a planar transformer 20 includes cores 21a, 21b and a multilayer substrate 22. The cores 21a and 21b are combined so that their inner leg and outer legs are inserted into through holes 22a, 22b, 22c which are formed in the multilayer substrate 22.

As illustrated in FIG. 4, the multilayer substrate 22 has insulating layers 25, 26, 27, 28, 29, 30, 31, primary main winding patterns 32a, 32b, secondary main winding patterns 33a, 33b, and an auxiliary winding pattern 34. In addition, a dummy layer 35 is formed between the insulating layers 25 and 26. A prepreg 36 is interposed between the primary main winding patterns 32a, 32b, the secondary main winding patterns 33a, 33b, the auxiliary winding pattern 34, and the insulating layers 26 to 31. Some of the insulating layers 25 to 31 each may be a prepreg.

The primary main winding patterns 32a, 32b and the secondary main winding patterns 33a, 33b are similar to the primary main winding patterns 10a, 10b and the secondary main winding patterns 11a, 11b in the planar transformer 1 according to the first embodiment. However, in the planar transformer 20 of the comparative example, auxiliary winding is also formed inside the multilayer substrate 22 as the auxiliary winding pattern 34.

As illustrated in FIG. 5, input/output terminals 23a, 23b, 23c, 23d are provided on the surface of the multilayer substrate 22, the input/output terminals 23a, 23b, 23c, 23d being connected to both ends of the primary main winding patterns 32a, 32b and the secondary main winding patterns 33a, 33b, respectively via through holes or vias (not illustrated). In addition, input/output terminals 24a, 24 are provided which are connected to both ends of the auxiliary winding pattern 34 via through holes or vias (not illustrated). The input/output terminals 23a, 23b, 23c, 23d, 24a, 24b are used when the primary main winding patterns 32a, 32b and the secondary main winding patterns 33a, 33b are electrically connected to an external circuit of the planar transformer 20.

Since the multilayer substrate 22 is provided with the auxiliary winding pattern 34 in the planar transformer 20 like this, five layers are provided to form winding patterns including the primary main winding patterns 32a, 32b and the secondary main winding patterns 33a, 33b.

When a stacked layer structure like the multilayer substrate 22 is formed, in order to avoid curling of the multilayer substrate 22, one or both sides of an insulating layer (core material) with the sides each having a winding pattern are pressed by an adhesive layer such as a prepreg, and bonded to an insulating layer with both sides each having another winding pattern under heating and pressure. For this reason, an even number of layers is provided to form the winding patterns (after an even number of layers is formed, the layers may be scraped off to form an odd number of layers, but this involves an additional cost).

Like the planar transformer 20 in the above-described comparative example, when the multilayer substrate includes one layer for forming the auxiliary winding pattern in addition to the four layers for forming the primary main winding patterns, the height of the multilayer substrate 22 with an additional insulating layer is increased. Furthermore, the layer (dummy layer 35) having no winding pattern is added. The dummy layer 35 is formed of material such as prepreg, and includes a conductive pattern (not illustrated) for maintaining the shape of the dummy layer 35. Addition of such dummy layer 35 further increases the height of the multilayer substrate, and thus the planar transformer is increased in size.

On the other hand, in the planar transformer 1 according to the first embodiment illustrated in FIGS. 1 to 3, the auxiliary winding 12 is disposed outside the multilayer substrate 3, thereby omitting the formation of the insulating layer 31 due to formation of the auxiliary winding pattern 34 as illustrated in FIG. 4. Furthermore, formation of the dummy layer 35 and the insulating layer 25 immediately under the dummy layer 35 are unnecessary in the planar transformer 1 of FIG. 1, the formation being due to an odd number of layers for forming the winding patterns (an even number of layers for forming the main winding patterns) as illustrated in FIG. 4. Consequently, the height of the multilayer substrate 3 may be decreased, and thus the planar transformer 1 may be reduced in size.

In addition, since the height of the cores 2a, 2b may also be decreased, a magnetic path length is reduced, and core loss during power transmission may also be reduced. The core loss is expressed by Loss=Pre×Ae×Le (Pre is loss per unit volume, Ae is effective cross sectional area, and Le is effective magnetic path length). It is to be noted that it is sufficient that only the length of the inner leg and the outer legs be decreased to reduce the height of the cores 2a, 2b, and thus the planar transformer 1 may be reduced in size without decreasing an inductance value.

It is to be noted that the auxiliary winding 12 is used for power supply to a control circuit that controls ON/OFF of a switch element in a switching power supply circuit in which the planar transformer 1 is used, and so the auxiliary winding 12 is used for transmission of relatively low power. For this reason, the coupling coefficient between the auxiliary winding 12 and the primary main winding patterns 10a, 10b or the secondary main winding patterns 11a, 11b may be lower than the coupling coefficient between the primary main winding patterns 10a, 10b and the secondary main winding patterns 11a, 11b. In other words, the auxiliary winding 12 may be disposed relatively away from the primary main winding patterns 10a, 10b or the secondary main winding patterns 11a, 11b. Therefore, even when the auxiliary winding 12 is disposed outside the multilayer substrate 3 as in the planar transformer 1 according to the first embodiment, the disposition has less influence on power transmission using the auxiliary winding 12.

Second Embodiment

Figure 6:
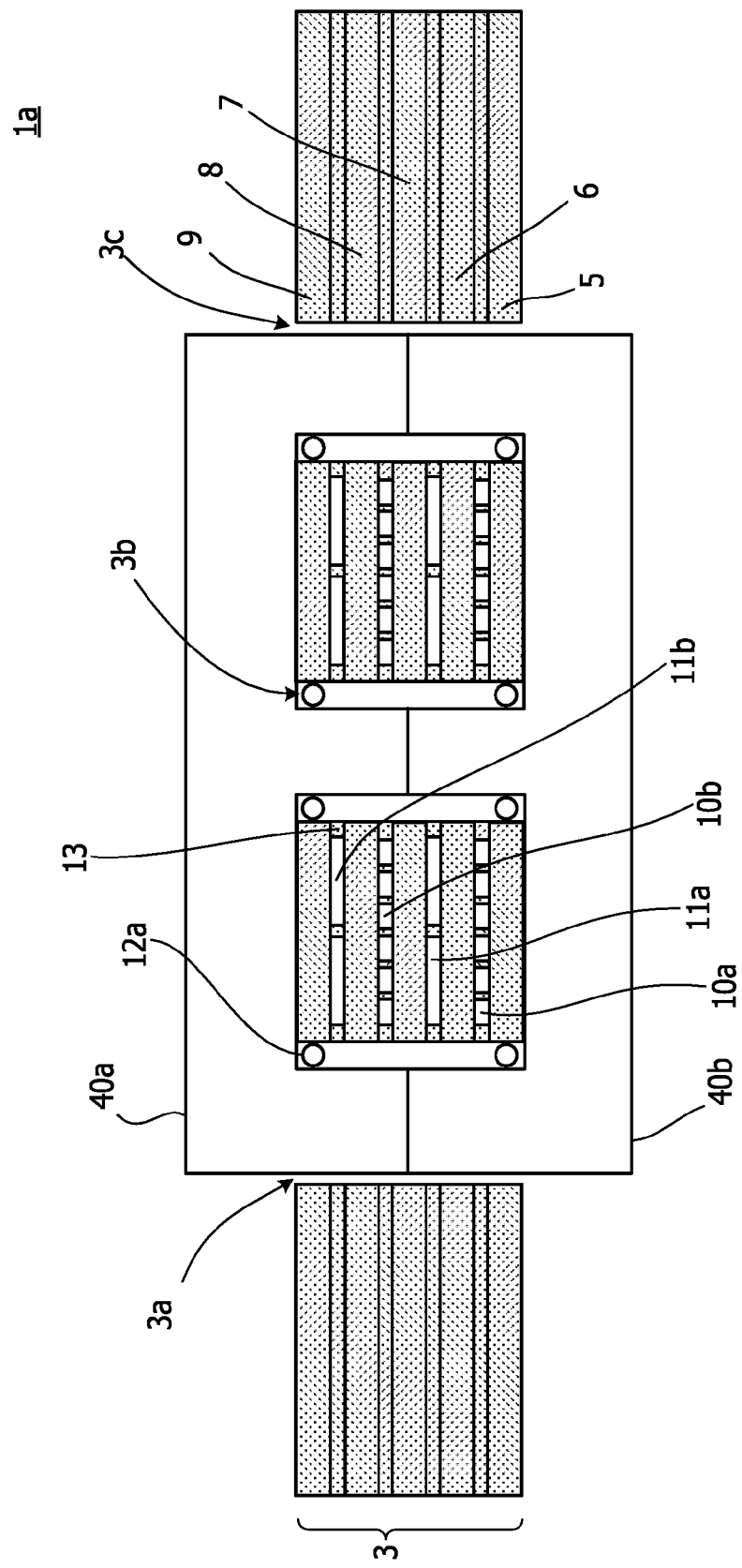
FIG. 6 is a cross-sectional view illustrating an example planar transformer according to a second embodiment.
Figure 7:
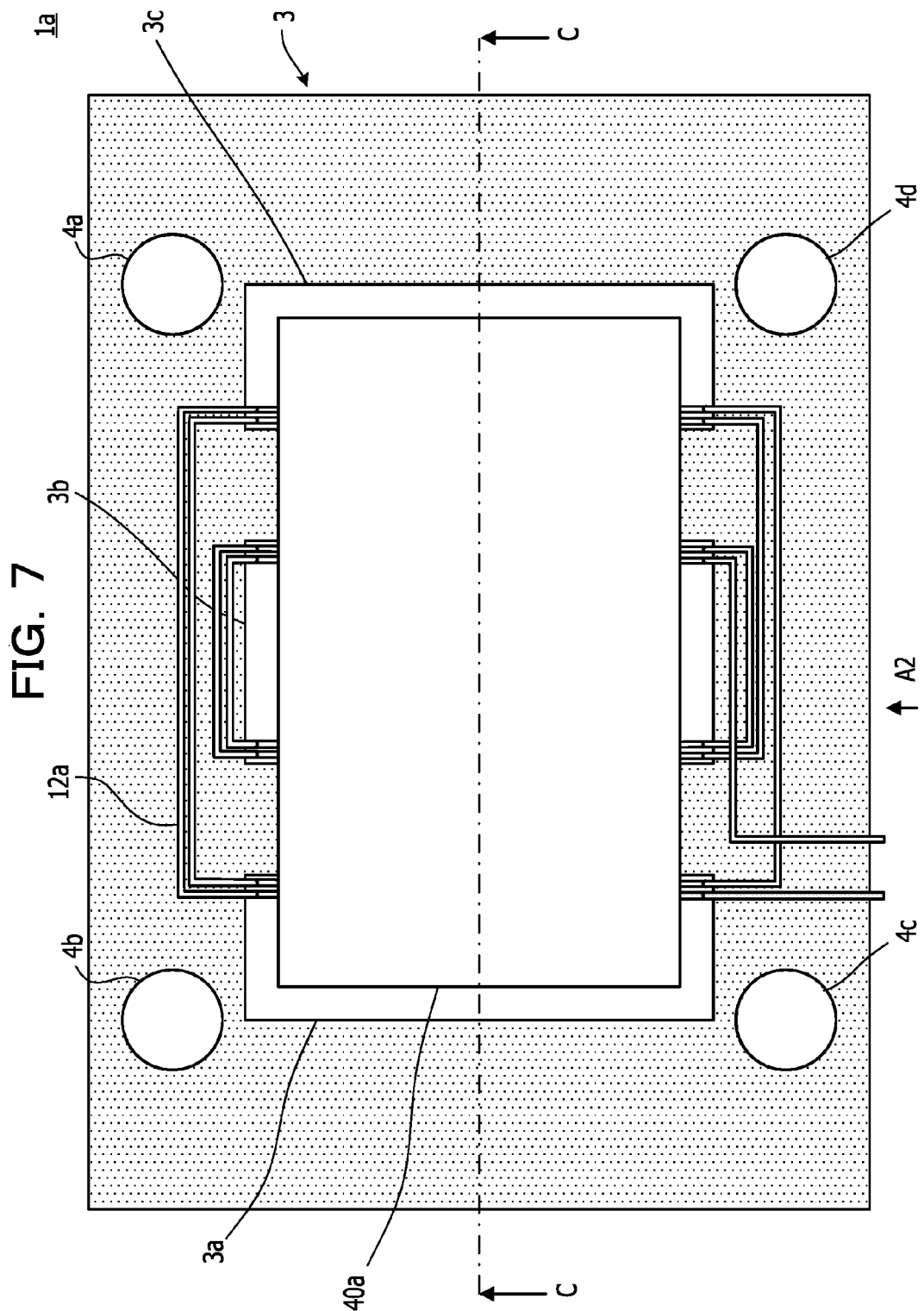
FIG. 7 is a plan view illustrating the example planar transformer according to the second embodiment.
Figure 8:
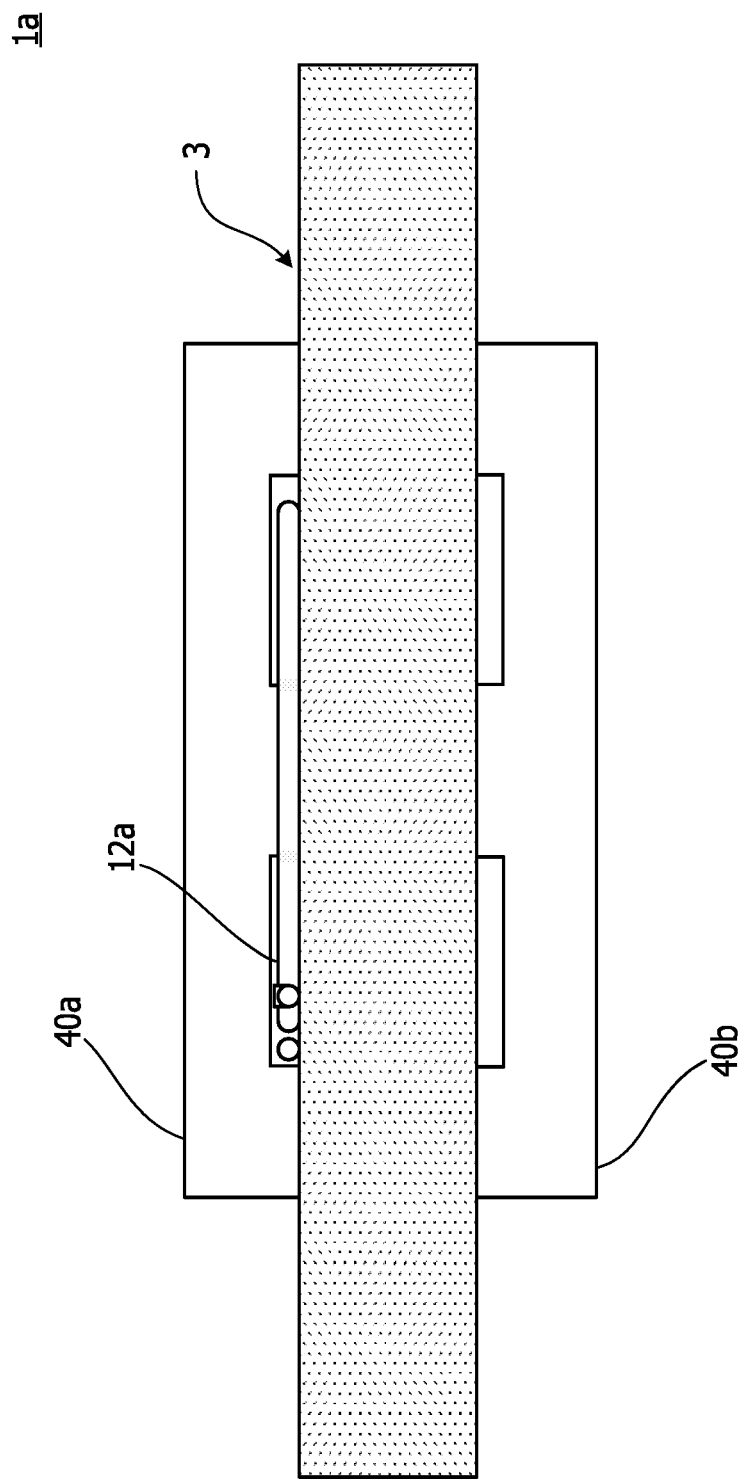
FIG. 8 is a side view illustrating the example planar transformer according to the second embodiment.

FIG. 6 is a cross-sectional view illustrating an example planar transformer according to a second embodiment, FIG. 7 is a plan view illustrating the example planar transformer according to the second embodiment, and FIG. 8 is a side view illustrating the example planar transformer according to the second embodiment. It is to be noted that FIG. 6 is a cross-sectional view of a planar transformer is taken along line VI-VI illustrated in FIG. 7. FIG. 8 is a side view of the planar transformer is as seen in the direction of arrow A2 of FIG. 7. The same elements as those in the planar transformer 1 according to the first embodiment will be denoted by the same symbol and a description will be omitted.

The planar transformer is according to the second embodiment includes cores 40a, 40b, a multilayer substrate 3, and an auxiliary winding 12a. Similarly to the planar transformer 1 according to the first embodiment, the auxiliary winding 12a is disposed outside the multilayer substrate 3. However, the disposition position is different from that in the planar transformer 1. In the planar transformer is according to the second embodiment, part of the auxiliary winding 12a (portion covered by the cores 40a, 40b) is disposed at the lateral walls of the through holes 3a, 3b, 3c formed in the multilayer substrate 3.

Accordingly, the height of the cores 40a, 40b may be decreased compared with the case where the auxiliary winding 12 is disposed on the uppermost insulating layer 9 of the multilayer substrate 3 as in the planar transformer 1 according to the first embodiment, and thus the planar transformer is may be further reduced in size. It is sufficient that only the length of the inner leg and the outer legs of the cores be decreased, and thus the planar transformer is may be reduced in size without decreasing an inductance value.

In addition, since the height of the cores 40a, 40b may be further decreased, a magnetic path length is reduced, and core loss during power transmission may also be further reduced due to the reason described above.

(Modification)

Figure 9:
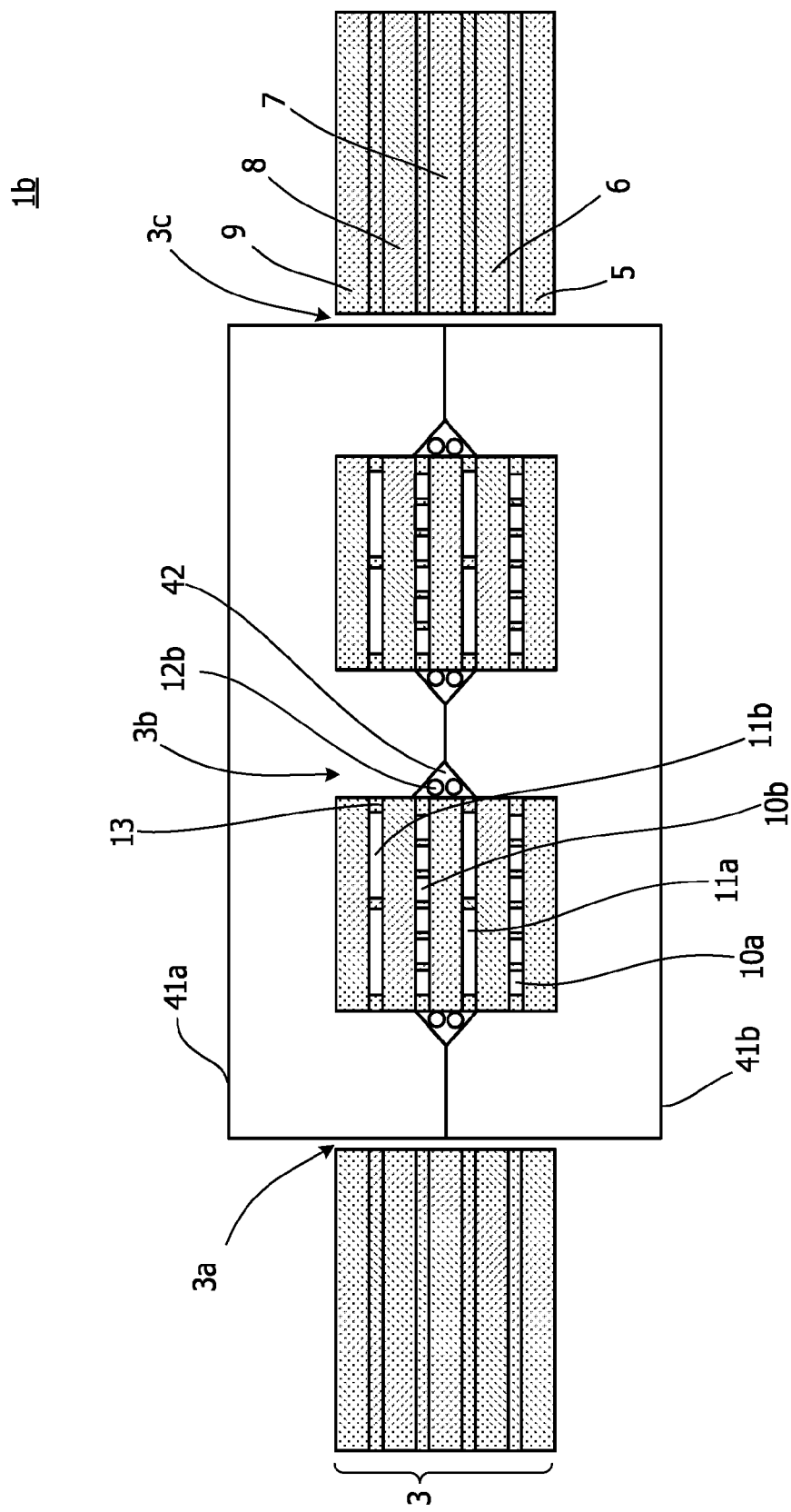
FIG. 9 is a cross-sectional view illustrating a modification of the example planar transformer according to the second embodiment.

FIG. 9 is a cross-sectional view illustrating a modification of the example planar transformer according to the second embodiment. The same elements as those in the planar transformer is according to the second embodiment will be denoted by the same symbol and a description will be omitted.

In a planar transformer 1b, a groove 42 is formed in cores 41a, 41b so that the groove 42 allows an auxiliary winding 12b to pass therethrough.

Figure 10:
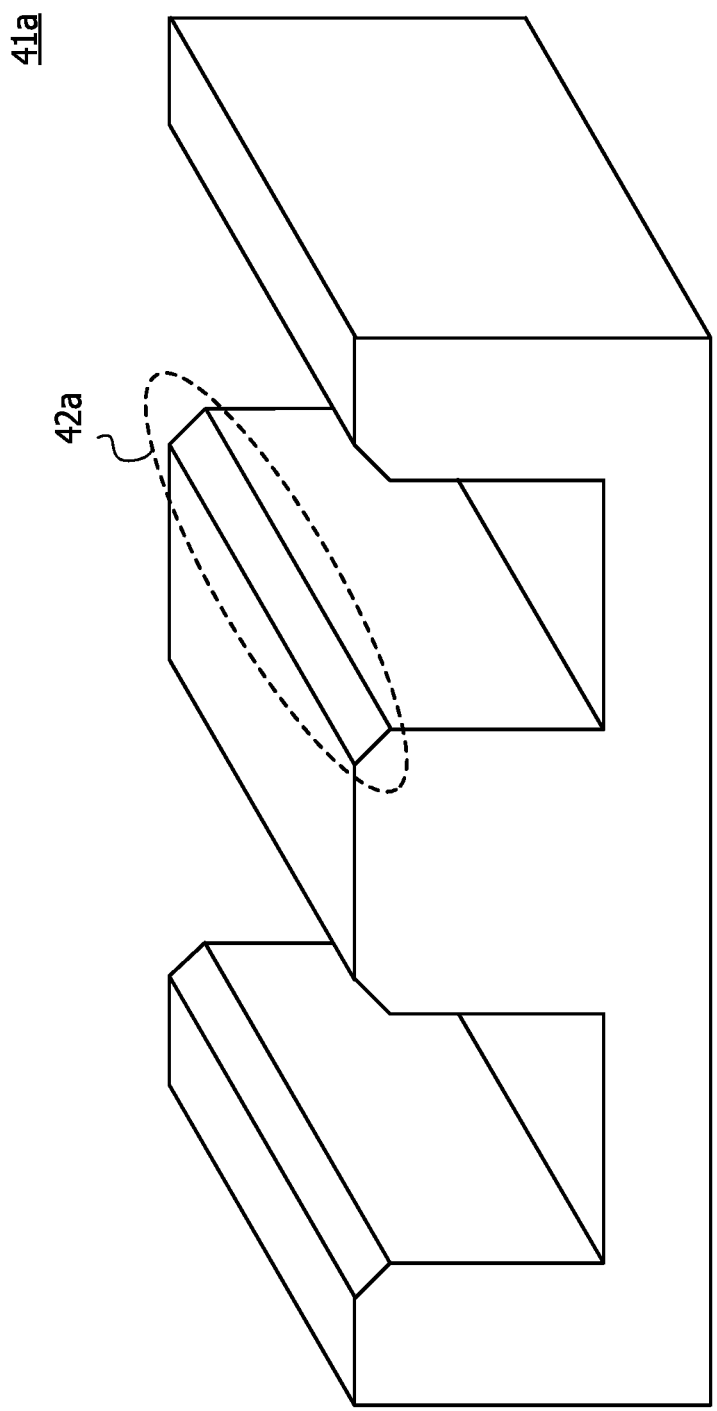
FIG. 10 illustrates an example core.

FIG. 10 illustrates an example core. In the core 41a, an inclined portion 42a is formed at each corner of the inner leg and the outer legs. Also in the core 41b, a similar inclined portion is formed, and the groove 42 as illustrated in FIG. 9 is formed by combining the cores 41a and 41b. The cross section of the groove 42 may not necessarily be large enough to allow the auxiliary winding 12b to pass through internally the groove 42.

The formation of the groove 42 like this enables the gap between the cores 41a, 41b and the multilayer substrate 3 to be decreased, and thus the width of the through holes 3a, 3b, 3c may be reduced. Because of this, space for forming other elements may be increased in the multilayer substrate 3, thereby translating into reduced size of any device that uses the planar transformer 1b.

The above-described modification provides an example in which the groove 42 allowing the auxiliary winding 12b to pass therethrough is formed in the cores 41a, 41b, the auxiliary winding 12b being disposed at the lateral walls of the through holes 3a, 3b, 3c of the multilayer substrate 3. However, modification is not limited to this. As in the planar transformer 1 illustrated in FIG. 1, a groove for passing the auxiliary winding 12b may be formed in the core 2a, the auxiliary winding 12b being disposed on the uppermost insulating layer 9 of the multilayer substrate 3. In this case, the height of the core 2a may be reduced and the planar transformer 1 may be further reduced in size. In addition, a magnetic path length is reduced and core loss during power transmission may also be further reduced.

(Switching Power Supply Circuit (Example of Application of Planar Transformer))

Application of the above-described planar transformer to a switching power supply circuit allows the switching power supply circuit to be reduced in size.

Figure 11:
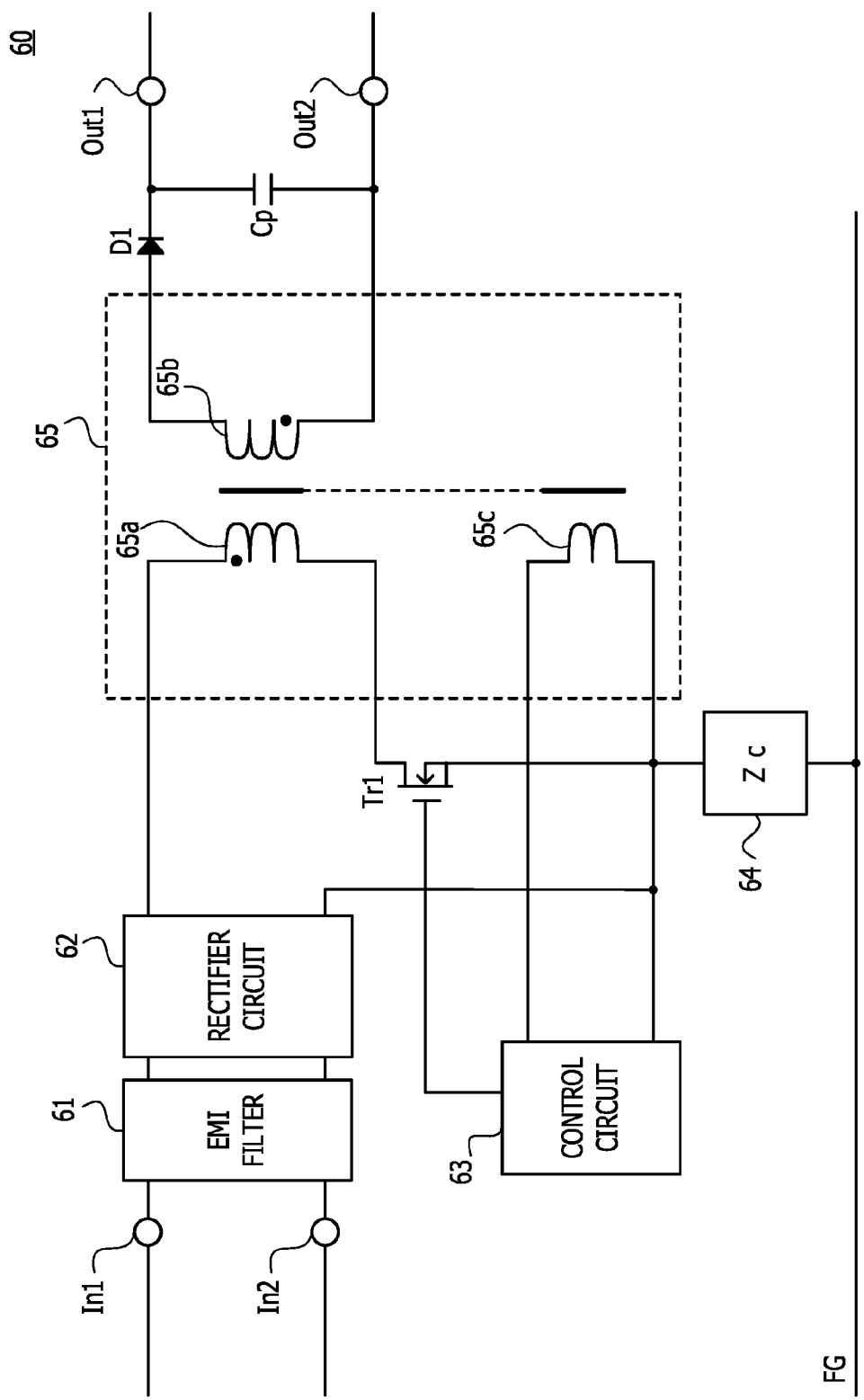
FIG. 11 illustrates an example switching power supply circuit.

FIG. 11 illustrates an example switching power supply circuit. A switching power supply circuit 60 has an electro magnetic interference (EMI) filter 61, a rectifier circuit 62, a switch element Tri, a control circuit 63, an impedance (Zc) 64, a planar transformer 65, a diode D1, and a capacitive element Cp. These elements may be formed in the multilayer substrate 3 of the above-described planar transformers 1, 1*a*, 1*b*.

The EMI filter 61 is connected to input terminals Int, Int to which an input signal (AC signal) is input and removes the noise which has been added to the input signal.

The rectifier circuit 62 rectifies the input signal. The switch element Tr1 includes, for example, a metal oxide semiconductor field effect transistor (MOSFET) and switches to determine whether or not a switching current based on the rectified input signal is supplied to the planar transformer 65. The switch element Tri has two input/output terminals (drain or source) and a control terminal (gate terminal).

The control circuit 63 supplies a control signal to the control terminal of the switch element Tr1 to control the operation of the switch element Tr1. For example, the control circuit 63 turns on or off the switch element Tri with a certain period. The impedance 64 is connected to between one of the input/output terminals of the switch element Tr1 and frame ground (FG).

The planar transformer 65 has a primary main winding 65*a*, a secondary main winding 65*b*, and an auxiliary winding 65*c*, then performs power transmission between the primary main winding 65*a* and the secondary main winding 65*b* as well as between the primary main winding 65*a* and the auxiliary winding 65*c*. The latter power transmission is performed for supplying power to the control circuit 63.

In the planar transformer 65, one end of the primary main winding 65*a* is connected to the rectifier circuit 62, and the other end of the primary main winding 65*a* is connected to the other of the input/output terminals of the switch element Tr1. In addition, one end of the secondary main winding 65*b* is connected to the anode of the diode D1, and the other end is connected to one end of the capacitive element Cp and an output terminal Out2. One end of the auxiliary winding 65*c* is connected to the control circuit 63, and the other end is connected to the impedance 64, the rectifier circuit 62, and the control circuit 63.

The diode D1 is provided between the planar transformer 65 and an output terminal Out1, the anode is connected to the secondary main winding 65*b* of the planar transformer 65, and the cathode is connected to the output terminal Out2.

The capacitive element Cp is connected between the output terminals Out1 and Out2.

In the switching power supply circuit 60 like this, one of the above-described planar transformers 1, 1*a*, 1*b* is applicable to the planar transformer 65. For example, when the planar transformer 1 illustrated in FIGS. 1 to 3 is applied to the planar transformer 65, the primary main winding 65*a* corresponds to the primary main winding patterns 10*a*, 10*b*. In addition, the secondary main winding 65*b* corresponds to the secondary main winding patterns 11*a*, 11*b*, and the auxiliary winding 65*c* corresponds to the auxiliary winding 12.

As described above, the disposition of the auxiliary windings 12, 12*a*, 12*b* outside the multilayer substrate 3 in the planar transformers 1, 1*a*, 1*b* allows the height of the multilayer substrate 3 to be reduced (the number of layers may be decreased), and thus the planar transformers 1, 1*a*, 1*b* may be reduced in size. Therefore, application of any of the planar transformers 1, 1*a*, 1*b* to the planar transformer 65 also allows the switching power supply circuit 60 using the same multilayer substrate 3 to be reduced in size.

It is to be noted that the elements of a converter circuit in addition to the elements of the switching power supply circuit 60 may be formed in the multilayer substrate 3. Consequently, it is possible to reduce the size of any device that has the switching power supply circuit 60 and the converter circuit on the same multilayer substrate.

Although an aspect of the planar transformer and the switching power supply circuit in the present disclosure has been described so far based on the embodiments, the aspect provides only an example, and is not limited to the aforementioned description.

For example, in the above-described examples, the auxiliary winding is in contact with the multilayer substrate. However, the auxiliary winding may not be in contact with the multilayer substrate as long as power transmission may be performed between the auxiliary winding and the primary main winding patterns or the secondary main winding patterns.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A planar type transformer comprising:
    a multilayer substrate including a primary main winding pattern and a secondary main winding pattern that perform first power transmission, the primary main winding pattern and the secondary main winding pattern being stacked with an insulating layer interposed between the primary main winding pattern and the secondary main winding pattern; and
    an auxiliary winding that is disposed outside the multilayer substrate and performs second power transmission between the auxiliary winding and the primary main winding pattern or the secondary main winding pattern.

2. The planar type transformer according to claim 1, wherein main winding patterns including the primary main winding pattern and the secondary main winding pattern are formed over an even number of layers with the insulating layer interposed between the primary main winding pattern and the secondary main winding pattern.

3. The planar type transformer according to claim 1, wherein part of the auxiliary winding is disposed at a lateral wall of a through hole that is formed in the multilayer substrate for insertion of a core.

4. The planar type transformer according to claim 1, further comprising
    a core that is inserted into a through hole formed in the multilayer substrate and covers part of the multilayer substrate, wherein the core has a groove that allows at least part of the auxiliary winding to pass through the groove.

5. A switching power supply circuit comprising:

a planar type transformer;

a rectifier circuit that rectifies an input signal;

a switch element that switches to determine whether or not a switching current based on the rectified input signal is supplied to the planar type transformer; and a control circuit that controls an operation of the switch element, wherein the planar type transformer includes a multilayer substrate having the primary main winding pattern and the secondary main winding pattern that perform first power transmission, the primary main winding pattern and the secondary main winding pattern being stacked with an insulating layer interposed between the primary main winding pattern and the secondary main winding pattern, and an auxiliary winding that is disposed outside the multilayer substrate, performs second power transmission between the auxiliary winding and the primary main winding pattern or the secondary main winding pattern, and supplies power to the control circuit.

* * * * *